United States Patent [19]

McElveen

[11] 4,303,316

[45] Dec. 1, 1981

[54] PROCESS FOR RECORDING VISUAL SCENES FOR REPRODUCTION IN STEREOPSIS

[76] Inventor: Robert H. McElveen, 103 Forest Hills Dr., Gaffney, S.C. 29340

[21] Appl. No.: 69,708

[22] Filed: Aug. 27, 1979

Related U.S. Application Data

[63] Continuation-in-part of Ser. No. 952,780, Oct. 19, 1978, abandoned, which is a continuation-in-part of Ser. No. 751,141, Dec. 16, 1976, abandoned.

[51] Int. Cl.³ .............................................. G03B 35/00
[52] U.S. Cl. ...................................... 352/57; 352/43; 352/86; 352/62
[58] Field of Search ...................... 352/57, 59, 65, 62, 352/60, 43, 53, 86, 89

[56] References Cited

U.S. PATENT DOCUMENTS

| | | |
|---|---|---|
| 765,980 | 7/1904 | Mercier . |
| 1,307,074 | 6/1919 | Baruch . |
| 1,394,797 | 10/1921 | Smith .................................. 352/43 |
| 1,488,027 | 3/1924 | Runcie ................................ 352/43 |
| 1,927,925 | 9/1933 | Dieterich ............................ 352/86 |
| 1,939,343 | 12/1933 | Feil . |
| 2,022,454 | 11/1935 | Barnes ................................. 352/86 |
| 2,080,604 | 5/1937 | Draper . |
| 2,101,979 | 12/1937 | Brock . |
| 2,114,060 | 4/1938 | Oakley . |
| 2,157,099 | 5/1939 | Rosenhauer . |
| 2,194,737 | 3/1940 | Cathey . |
| 2,375,962 | 5/1945 | Terwilliger ......................... 352/43 |
| 2,482,908 | 12/1969 | McCormick . |
| 2,566,700 | 9/1951 | Goldsmith . |
| 2,627,200 | 2/1953 | Huber . |
| 2,727,427 | 12/1955 | Jenkins ............................... 352/89 |
| 2,838,975 | 6/1958 | Laube et al. . |
| 2,891,440 | 6/1959 | Barake . |
| 2,952,182 | 9/1960 | Marks et al. . |
| 2,996,949 | 8/1961 | Le Ray ............................... 352/60 |
| 3,006,241 | 10/1961 | Marks et al. . |
| 3,240,549 | 3/1966 | Wells . |
| 3,482,913 | 12/1969 | Glenn . |
| 4,131,342 | 12/1978 | Dudley ............................... 352/86 |

Primary Examiner—Monroe H. Hayes
Attorney, Agent, or Firm—Luke J. Wilburn, Jr.; Wellington M. Manning, Jr.

[57] ABSTRACT

A process for recording and projecting a three-dimensional visual scene onto a receiving surface from which the scene may be viewed in stereopsis by the unaided human eye. The scene is recorded from right and left view positions laterally separated by a distance of no more than about one inch, and groups of recorded right and recorded left views are alternately projected onto a receiving surface in sequence such that the visual duration of each group varies from a minimum to a maximum time which is generally proportional to the distance of the nearest non-moving object of special regard in the scene from the recording positions and is approximately equal to the visio-psychological suppression rate of the human eyes.

To eliminate possible distance variations of right and left view cameras from the visual scene and the need for film editing to align right and left view film frames on a single film strip, the views may be recorded by use of a single lens camera with moving shutter to alternately block right and left half portions of the lens in desired sequence. The central points of focus of the left and right views may be selectively set at different distances during recording to reduce "keystoning" effect of the projected views.

The process has application throughout the field of the visual arts, e.g., both in motion picture and in television, and may be projected from a single projector source. Also disclosed is a motion picture filmstrip product.

39 Claims, 9 Drawing Figures

PROCESS FOR RECORDING VISUAL SCENES FOR REPRODUCTION IN STEREOPSIS

This is a continuation-in-part application of my copending U.S. Patent application Ser. No. 952,780, filed Oct. 19, 1978, now abandoned which is itself a continuation-in-part of my previous U.S. patent application Ser. No. 751,141, filed Dec. 16, 1976 now abandoned.

The prior applications and the present invention are directed to the production of motion pictures which may be viewed in three-dimension, or stereopsis, by the human eye and, more particularly, to a process for recording both still and moving visual scenes and objects which may be projected for visualization in stereopsis by the unaided eye on a two-dimensional receiving surface, and with conventional projection and viewing equipment presently available in the prior art. The process includes the simultaneous recording of a visual scene from two cameras with spaced lens bases, or from a single camera lens system in which right and left half portions of the lens are alternately blocked in a desired sequence, to provide the recording of spaced predominant right and left views of the visual scene.

The term "visual scene" as used in the specification and claims herein means and includes any visible object or image or groups of objects or images, both moving and still, which can be observed in three-dimension in the real world by the human eyes. Such term typically includes, without limitation, all amimate and inanimate objects, alone or in combination, and moving or still, in which the human eyes may perceive a depth relationship.

As used herein, the term "recording", when referring to a visual scene, means capturing information of a visual scene in any form which may be used to project the scene onto a receiving surface for visualization. Such term includes capturing the visual scene on photographic film, such as in the motion picture field, as well as capturing the visual scene as any electronic, magnetic, electromagnetic, sound, or other signal information which may be reproduced as visible images on a receiving surface, such as in the television field.

As used herein, the term "projecting" when referring to recorded views of visual scenes includes the transmission, in any manner, of the recorded visual scene information, e.g., photographic film image, electronic, electromagnetic, sound, and other signal information, onto a receiving surface for visible observation.

BACKGROUND

Although the human anatomy provides in man the innate, or natural, ability to see in depth, or stereopsis, the three-dimensional real world scene, where the visual "screen" for the eyes is of infinite depth, man does not have such natural ability when the viewing screen is two-dimensional, as in the video arts, e.g., the motion picture and television fields. For years attempts have been made to reproduce three-dimensional, real world scenes so that they can be viewed in depth on a two-dimensional surface.

The anatomical and psychological capability of men to visualize the three-dimensional, live world scene in stereopsis, or depth, has long been a subject of investigation, and much has been learned and written about the human visual apparatus, i.e., the eyes and brain of the body. It is generally known that man's natural ability to visualize three-dimensional objects and scenes in depth, or stereopsis, is due to a combined operation of the two eyes and the brain to produce a visio-psychological impression in the mind. More specifically, it is known that the actual view received in the left eye and the actual view received in the right eye, when a visual scene is observed, are slightly different because of the displacement, or distance of separation, of the eyes in the head. This interocular separation, or disparity, is approximately 63 mm, or 2½ inches, in the normal adult. These slightly differing right and left views received by the respective eyes are continuously transmitted to the brain where the right and left views are psychologically "combined" by the brain to create a resultant "cyclopean", or one-eye, view in the mind, wherein near objects and far objects in the three-dimensional real world scene appear at their actual distances from the observer. Most authors believe that a true fusion of right and left eye views occurs in the brain to produce the single "cyclopean" view of the mind, although there is another theory that a "replacement" phenomena occurs wherein the brain alternately suppresses right and left eye views to produce the cyclopean resultant view in the mind. In any event it is agreed that the ability of man to visualize a three-dimensional scene in depth is principally attributed to the visual parallax created by the interocular separation of the eyes to provide the brain with slightly different left and right views of the same scene. This is supported by the fact that a one-eyed man cannot observe three-dimensional scenes in depth as does the two-eyed individual.

It has also been postulated that in the human visual apparatus the single eye sees both right and left views of a visual scene, i.e., the right view being that which is "seen" by the right eye temporal retina and the left eye nasal retina, and the left view being that which is "seen" by the right eye nasal retina and the left eye temporal retina. However, three-dimensional effect is suppressed or not obtained with the single eye in fixed position because of lack of disparity, i.e., distance of separation, of the two single eye views.

Therefore, in attempts to reproduce three-dimensional scenes in depth on a two-dimensional surface, many have been led to take left and right view photographs with cameras spaced at ocular separation, i.e., as the human eyes would actually see the same scene, to superimpose these photographs on a two-dimensional screen, and in viewing the scene, to block all right views for the left eye and left views from the right eye of the observer to permit three-dimensional assimilation of the views by the brain.

Early work in the area of three-dimensional still photography produced the steroptican, in which two single frame pictures recorded on film by a stereocamera having a lens base separation equal to the distance between the human eyes are simultaneously projected from spaced projection points and superimposed upon a screen to produce a composite picture which can be observed in depth. In the motion picture field, motion pictures have been produced for viewing in depth by use of multiple projectors and filmstrips which simultaneously project, with differently polarized light, right and left images of a visual scene onto a screen. By wearing correspondingly polarized glasses, a viewer receives only left view images in the left eye and right view images in the right eye so that the visio-psychological operation of the human visual apparatus produces an impression of stereopsis in the mind of the viewer. Although such three-dimensional motion pictures were commercially exhibited to the public, they apparently were not well accepted, and their popularity was short-lived in the industry. Such motion pictures not only required the purchase and use of special additional projection equipment and glasses which had to be worn by the viewers, but also the stereopsis, or depth, produced in the pictures was overly exaggerated and appeared to be more than that seen in real life, quite often causing many viewers to experience headaches as a result of viewing the pictures.

It has also been proposed in the past to provide apparatus and processes for recording and reproducing visual scenes for viewing in stereopsis by the unaided eye, i.e., without the necessity of special glasses or viewing equipment to be used by the viewing audience. Typical apparatus and processes heretofore proposed for three-dimensional photography are described in the following U.S. patents:

| | | | |
|---|---|---|---|
| 765,980 | Mercier | 2,627,200 | Huber |
| 1,307,074 | Baruch | 2,838,975 | Laube |
| 1,939,343 | Feil | 2,891,440 | Barake |
| 2,080,604 | Draper | 2,952,182 | Marks et al |
| 2,101,979 | Brock | 3,006,241 | Marks et al |
| 2,114,060 | Oakley | 3,240,549 | Wells |
| 2,157,099 | Rosenhauer | 3,482,908 | McCormick |
| 2,194,737 | Cathey | 3,482,913 | Glenn, Jr. |
| 2,566,700 | Goldsmith | | |

U.S. Pat. Nos. 2,101,979 and 2,157,099 propose the production of stereoptic motion pictures by photographing left and right views of a scene from laterally spaced positions less than interocular with a single camera having rotating mirror and blocking shutter, respectively, to record the views on alternate single frames of a moving filmstrip. U.S. Pat. No. 2,101,979 further suggests that the frames of the filmstrip may be laterally shifted to align the same on the strip and reduced disparity between left and right views.

U.S. Pat. No. 3,366,438 discloses the use of multiple cameras with mirrors and lens system to photograph a scene from laterally spaced positions for stereoptic reproduction.

Although numerous proposed solutions, as indicated in the foregoing patents, have been given to enable production of motion pictures for visualization in three-dimension by the unaided eye, I know of no present commercially accepted or used process or system which proves the validity of the aforementioned proposals or achieves this long sought objective. In addition, many prior art proposals require highly specialized, complicated equipment for projection and viewing which requires extensive and expensive modification of existing equipment in the video arts.

OBJECTS OF THE INVENTION

It is therefore an object of my present invention to provide a process for reproducing motion pictures in stereoposis, or depth, which may be simply and economically employed throughout the entire field of the video arts.

It is another object of the present invention to provide a process for producing motion pictures which may be viewed in stereopsis by the unaided eye, and which may be projected for viewing on conventional projector equipment and screens which are presently available in motion picture theaters.

It is another object of the invention to provide three-dimensional motion pictures which may be viewed in depth by an observer located at any position relative to the viewing screen, and without objectionable shake, or keystoning, of the visual scene to the observer.

It is another object to provide a process for producing motion pictures in stereopsis which may be transmitted and viewed in depth by the unaided eye of a viewer on conventional television receiver equipment.

It is a further object to provide a process for reproducing, in stereopsis, on a two-dimensional viewing surface, real life scenes as they occur, as in live television programming, and wherein the same will appear in stereopsis on standard television receiver equipment to be viewed by the unaided eye of the observer.

It is a still further object of the present invention to provide a process for reproducing scenes in stereopsis on a two-dimensional receiving surface which has universal application in the visual communication field.

It is another object to provide a motion picture filmstrip product containing visual scenes which may be projected from a single projector onto a receiving surface for visualization in stereopsis by the unaided human eye.

GENERAL DESCRIPTION OF THE INVENTION

My present invention is the discovery of a process whereby three-dimensional, live world scenes may be recorded and projected from a single film, video-tape, or transmission channel onto a two-dimensional receiving surface for visualization in stereopsis by the unaided human eye. In the motion picture film industry, this permits the recording to be projected from a single filmstrip so that existing projector and screen equipment presently available in motion picture theaters may be employed. In the field of television, the process will permit the transmission of three-dimensional scenes, both live and on video-tape, for reception and visualization in depth on conventional television sets, without the need of modification of the sets. Thus, the process is believed to have universal application in the video arts media to provide the first unaided visualization in stereopsis of three-dimensional scenes on any existing two-dimensional surface, and without the use of additional equipment for this purpose.

In its broad aspects, the present process comprises the discovery that by carefully controlling several parameters in the recording and projection of visual scene, excellent stereopsis may be obtained. More specifically, the process includes the step of recording a plurality of right and left views, or predominately right and left views, of a visual scene from corresponding right and left positions laterally displaced from each other no more than about one inch apart, and preferably between about $\frac{1}{8}''$ to $\frac{3}{4}''$, and continuously projecting, in alternating sequence, a group of one or more of the right recorded views and a group of one or more of the left recorded views onto a receiving surface, with the sequence of projection of the groups being timed such that the visual duration of each group on the receiving surface approximately equals the visio-psychological suppression, i.e., alternation, rate between right and left eye views of the human visual apparatus.

In addition to controlling the lateral recording distance between right and left views, and the duration of alternating visualization of such views, I have now found that side to side movement, or keystoning effect which may be observed by the viewer of non-moving objects in the scene when right and left views of the scene are alternately projected on the viewing surface (due to lateral displacement of the recording cameras) can be minimized below objectionable level by also varying the central point of focus of the right and left recordings of the scene. More specifically, if either the left or right recording camera of the overall scene is centrally focused at a nearer point than the nearest non-moving object in the scene while the other recording camera is focused at a further point in the scene than the nearest non-moving object, the alternating projection of such right and left recorded views can be visualized as well as recorded in stereopsis with greater depth of field and without objectionable keystoning effect.

This combined control of lens base separation and focus disparity, together with proper control of duration of visualization and proper alignment of right and left views in projection of the scene provides excellent stereopsis while minimizing jump, or "keystoning" effect, heretofore believed to have been a major problem in all prior attempts to provide stereoptic visualization by the unaided eye.

In the process of my present invention, it is essential that a lateral distance much less than interocular be employed at all times between the recording positions of the visual scene, in order that a true three-dimensional effect be achieved without excessive lateral disparity in the reproduction of the left and right view recordings. More specifically, the two recording positions for the visual scene must be maintained at a lateral separation of no more than about 1 inch, (with a distance of approximately ⅛ to ¾ inch being suitable in most instances) to avoid breaking up or unacceptable jumping of the non-moving objects in the visual scene during observation on a two-dimensional surface.

In the process of the present invention, the recorded right and left views of the visual scene must also be projected so as to bombard the human visual apparatus with alternating right and left view images at a certain tempo such that the visual duration of each right view image and each left view image on the viewing surface is apparently equal to the visio-psychological alternation rate of the brain between right and left views of the human visual apparatus. Through experimentation, I have discovered that this alternation rate between right and left views by the brain which permits the mind to visualize the scene in stereopsis is between about 1/24th to ¼th of a second. Thus, in producing a motion picture film for three-dimensional projection, and employing a conventional camera and projector speed of 24 frames per second, stereopsis is obtained by alternately projecting sequential right frame groups and left frame groups which are each of about 1 to 6 frames in duration, with 3 frames per group being preferred in most instances. The resulting picture on the two-dimensional receiving surface of right and left view recorded images is thus perceived by the human visual apparatus in stereopsis, or depth, just as it would appear in the real world scene which has been recorded. Surprisingly, since this alternating right and left eye view alternation is created on the photographic filmstrip itself, a one-eyed man can observe the projected scene in stereopsis, as well as a two-eyed man.

In a preferred form of the invention, I have found that by setting the central point of focus of the left and right recorded views of the scene at different selected distances, controlled focus disparity between left and right views effectively minimizes keystoning effect, or lateral shifting, of predominant non-moving objects in a scene when left and right view images of the scene are alternately projected for viewing.

More particularly, I have discovered that all moving objects in a scene may be disregarded when establishing the control parameters of lens base separation, film frame tempo (or visual duration of left and right views), and focus disparity to give optimum stereopsis. The important scene considerations in establishing control parameters mentioned above are the predominant non-moving, or inanimate, objects in the visual scene to be recorded and, in particular, the closest predominant non-moving object in the scene. I have discovered that by setting the central point of focus of one recording camera at a distance in front of the nearest non-moving object which is approximately one-third of the distance to the object, while setting the central point of focus of the other camera at a distance behind the nearest object which is approximately one-third more than the distance to the object, visual observation of keystone effect is substantially eliminated.

By way of example, I have observed that for most camera lens systems, focus distances above 30 feet from the camera may be generally considered and handled as infinity focus for the lens system. Thus, in employing the focus disparity concept to effectively eliminate keystoning between left and right view projections, the following chart indicates typical distance settings for left and right view recording lens systems.

| Distance to Nearest Non-Moving Object In Scene | 30' | 24' | 12' | 6' | 3' | 1' |
|---|---|---|---|---|---|---|
| Distance Setting For Lens System of Recording Position #1 | Inf. | Inf. | 16' | 8' | 4' | 1⅓' |
| Distance Setting For Lens System of Recording Position #2 | 20' | 18' | 8' | 4' | 1' | ⅔' |

In view of the fact that the visual scene may be reproduced for viewing in stereopsis by the unaided eye on a two-dimensional surface by use of a single projection source, it can be readily understood that the process may be employed to reproduce live as well as prerecorded events in stereopsis on a conventional television screen, since transmission of video information of right and left views does not require multiple sources of projection.

The invention may be better understood by the following detailed description of apparatus which may be employed to carry out the process in producing a motion picture film, as illustrated in the accompanying drawings, in which.

DESCRIPTION OF PREFERRED EMBODIMENTS

Figure 1:
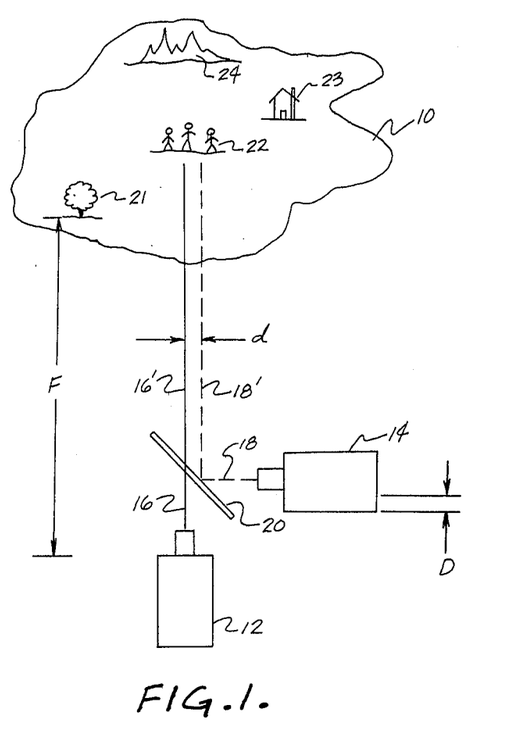
FIG. 1 is a schematic plan view of a motion picture two-camera arrangement which may be employed to record a three-dimensional visual scene for subsequent projection onto a two-dimensional receiving surface for stereoptic visualization by the human visual apparatus.

Referring more specifically to the drawings, FIG. 1 illustrates schematically, in plan view, a first form of the invention comprising a motion picture two-camera arrangement which may be employed to photograph, and thus record, on motion picture film, left and right views of a visual scene to be subsequently projected for viewing in stereopsis. As seen, a three-dimensional visual scene, indicated generally at 10, is simultaneously photographed by two standard motion picture cameras 12, 14 positioned with their lens axes 16, 18 in common plane and at right angles to each other. Positioned on the lens axis of each camera and at a 45° angle thereto is a standard two-way mirror 20 of the type which reflects a portion of the light received on its surface, while transmitting the remaining portion therethrough. Typically, the mirror may be constructed to reflect 50% light while transmitting 50% light such that the lens of each camera receives a view of the visual scene with equal intensity.

Each of the cameras are suitably supported on a base (not shown) to ensure that their lens axes are directed at all times in a common plane. Camera 14 is adjustably mounted for incremental movement along an axis parallel to the lens axis 16 of camera 12. By incrementally positioning camera 14 through a distance D along the axis of sight to the scene of camera 12, the effective lens base separation d of the two cameras may be varied. Thus, as shown, the lens of camera 12 receives a left view of the visual scene 10 which passes through the mirror, while the lens of the camera 14 receives a right view of the visual scene which is reflected by the mirror. Obviously, other means may be devised for similarly obtaining an effective lens base separation between the lenses of the two cameras, such as prisms, angular mirrors, or the like. Preferably, the lenses of the cameras are positioned to provide parallel lines of sight 16', 18' to the visual scene to be recorded.

The support base for the two cameras is, in turn, adjustably supported in suitable manner so that the cameras 12, 14 may be moved simultaneously in any direction to record a visual scene while maintaining the lens axes of the cameras in their proper relationship, as described.

To record a visual scene on photographic film, the dual cameras 12, 14 are synchronized, frame for frame, and simultaneously operated at a 24 frame per second filmspeed to take corresponding left and right view pictures of the scene. As previously indicated, for proper reproduction of the recorded scene in stereopsis, the effective lens base separation, d, of the cameras must be maintained at all times at a distance of no more than about 1 inch, with about a ½ inch lens base separation being employed for recording most visual scenes. Experimentation has indicated that the lens base separation may be varied between from about ⅛th inch to 1 inch, depending on the distance from the recording camera system to the nearest non-moving objects, as will be explained. It has been found that lens base separations of less than about ⅛th inch do not show sufficient depth in the projected scene, while separations of greater than 1 inch cause the projected picture solidarity to be broken.

As further indicated in FIG. 1, the live visual scene 10 may typically contain a nearest non-moving object, such as bush 21, an intermediate moving object or objects such as live actors 22, a more distant non-moving object, such as a house 23, and extremely distant non-moving objects, such as mountains 24. In such case, and with a fixed-position camera system, the object of principal concern in establishing control parameters of the recording cameras 12, 14, is the nearest non-moving object in the scene, or bush 21.

The actual or approximate distance F from the recording cameras 12, 14 to the bush 21 is determined and the lens base separation d between cameras selected in accordance with chart recommendations set forth in FIG. 7, as will be explained. The center of focus of the lens system of camera 12 is adjusted in known manner to a central focal point distance which is two-thirds of the distance F to bush 21, while the lens system of camera 14 is set at a central focal point distance which is one and one third of the distance F. Thus the central focus of the two recording cameras are set respectively to fall in front of and beyond nearest non-moving object 21 by approximately one-third of its distance from the cameras. Assuming that distance F is 12 feet, focus of camera 12 would be set at 8 feet while focus of camera 14 would be set at 16 feet. The scene is then simultaneously recorded by both cameras.

Figure 2:
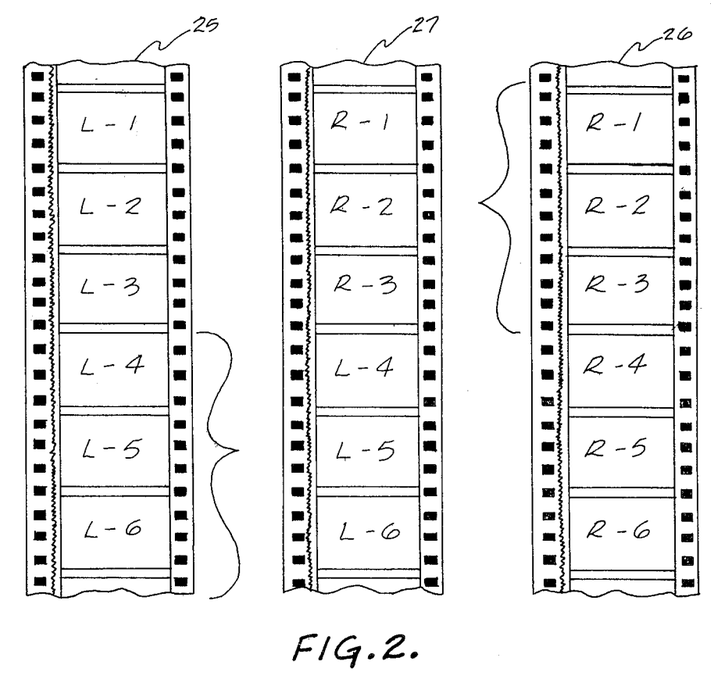
FIG. 2 is a schematic drawing illustrating the manner in which groups of frames from right and left view-containing filmstrips from the two cameras in FIG. 1 may be alternately reproduced on a single motion picture filmstrip for projection for stereoptic visualization.

After recording the visual scene, the filmstrips from the left and right cameras 12, 14 are developed, and a single filmstrip containing left and right camera film frames is obtained. As illustrated in FIG. 2, the left and right view filmstrips 25, 26 from the respective left and right cameras 12, 14 of FIG. 1 are combined to produce a single filmstrip 27 which may be projected on a two-dimensional surface for viewing in stereopsis. As illustrated, the developed left and right view filmstrips 25, 26 are arranged, frame for frame, and sequential groups of frames of left views and right views are alternately combined to form the single filmstrip 27 for projection. In the example illustrated in FIG. 2, the single filmstrip 27 is composed of the three consecutive right view frames R-1, R-2, R-3, followed by the three consecutive left view frames L-4, L-5, L-6. This alternating sequence of groups of consecutive right and left view frames is continued, i.e., L-7, L-8, L-9, R-10, R-11, R-12 (not shown), throughout the preparation of the single filmstrip 27 to provide a resultant filmstrip which, upon projection at 24 frames per second, produces a screen image of groups of alternating left and right views, each group visible to the eye of a viewer for approximately ⅛th of a second. The unused frames on the left and right filmstrips obviously may be similarly combined to form another filmstrip for stereoptic viewing, if desired.

To insure minimum flicker or jump of the scene as right and left view images are alternately projected on the screen, it is desirable that the right and left frames be carefully positioned on the composite filmstrip so that the predominant non-moving objects in the record scene will appear as closely superimposed on the screen, as possible. The exact manner in which frame views of the left and right filmstrips are combined to form a single filmstrip, physically or by photographic reproduction, may vary, and conventional equipment well known in the motion picture industry which do not require actual cutting and splicing of the left and right view filmstrip frames may be employed. Such equipment is well known and details thereof will not be described. The single composite filmstrip of sequenced left and right view frames is thereafter projected by a standard motion picture projector onto a two-dimensional screen, and the resultant pictures may be viewed in stereopsis by the unaided eye of the viewer. In the production of a motion picture film, the composite filmstrip may be edited to provide special effects or achieve desired continuity, as may be done with conventional two-dimensional motion picture films.

Although, in the example illustrated, alternating groups of three frames of left view followed by three frames of right view have been described, it has been found, through experimentation that variations may be made within a camera lens base separation of ⅛ inch to 1 inch, as well as within the 1/24 to ¼ second image duration range of left and right view images on the projection screen, to obtain optimum stereoptic effect in certain situations. For example, if the closest non-moving object in the scene to be recorded is relatively close to the cameras, then the lateral lens base separation may be decreased to as low as about ⅛ inch without loss of stereoptic effect in the projected image. Similarly, if the closest non-moving object is at relatively far distance, such as a mountain range, and no non-moving objects are nearer the point of recordation, the effective lens base separation of the two cameras can be increased to as much as 1 inch, with satisfactory stereoptic results on the projected image. It has been found that for normal filming of normal size objects within a 10–30 foot range, the best workable lens base separation for maximum depth without annoying disparate jump in the projected image is from about ¼ to ¾ inches, with ½ inch being preferred.

If an extremely close non-moving object is to be recorded and projected in depth, the number of right and left frame views in each group of the composite film may be decreased to as low as 1 frame right, 1 frame left (using a 24 frame per second camera and projector speed) for a visual image duration of about 1/24 of a second per view on the projection screen. Similarly, if the nearest non-moving object in the scene is a far distant object, it has been observed that the number of frames in each group may be increased to as much as 5 to 6 right or left views per group with satisfactory stereoptic effect in the reproduced image.

Thus as can be seen from the foregoing explanation, the optimum stereoptic effect in reproduction of a visual scene may be obtained for a particular distance and/or size of nearest non-moving object by maintaining a "tempo" within a range, that is, by slightly varying the lens base separation and the duration of observation of the right and left views on the projection screen, and by focus variations within the limits hereinbelow described.

Although the duration of visible observation of alternating left and right view images of the projection screen are preferably maintained equal for the same scene reproduction, it may be possible to slightly vary the durations between right and left views for a given scene without appreciably losing the stereoptic effect in the viewed scene.

Although the foregoing description has been directed to motion picture production with camera and projector speeds of 24 frames per second, the same lens base separation range of the camera, range of focus disparity between left and right views, and the same range of duration of visual observation of left and right views applies if camera and projector speeds are varied, as in slow motion, fast motion, or special effect situations. The number of film frames in each group would only be varied to maintain the time duration for visualization described.

In the television field, dual television cameras may be employed, in a similar manner as described for motion picture cameras, and the electronic transmissions therefrom (in the case of video tape or live television reproduction) transmitted in alternating sequence of right and left view groups to provide the desired visual duration time between right and left views on the television receiver set.

Figure 3:
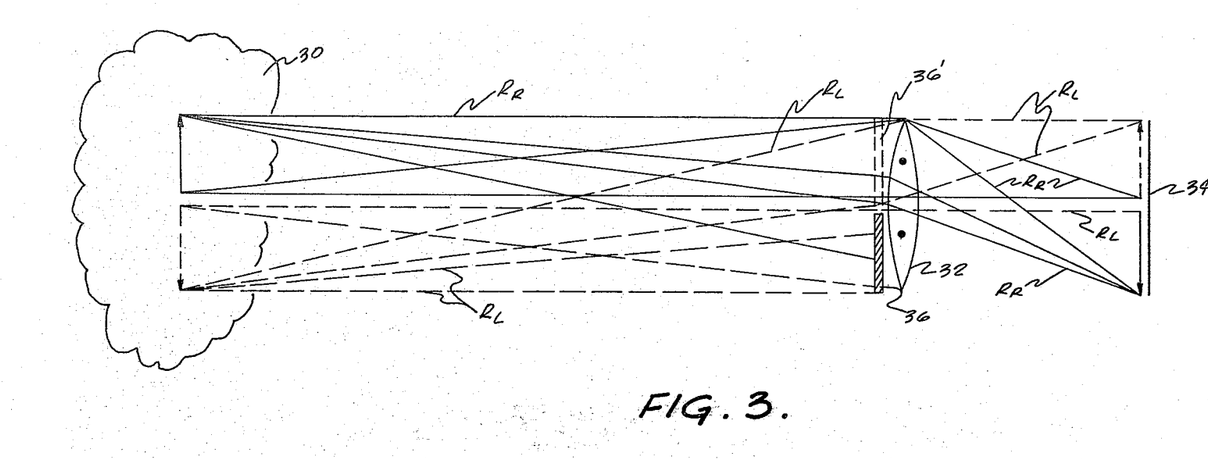
FIG. 3 is a diagrammatic plan view representation of light rays entering a single lens camera system adapted with shutter mechanism for alternately recording predominantly left and right views of a three-dimensional visual scene on a single recording surface for projection onto a viewing surface for visualization in stereopsis.

FIGS. 3–5a and 5b illustrate a modified form of the invention from that shown in FIGS. 1 and 2 wherein a single camera may be employed to alternately record predominantly left and right views of a three-dimensional visual scene on a single recording surface, or filmstrip, which may be projected onto a two-dimensional surface for stereoptic viewing by the unaided eye. FIG. 3 illustrates diagrammatically in plan view the paths of light rays passing from a three-dimensional visual scene 30 through a single lens system 32 onto a single recording surface or filmstrip 34. Positioned in front of lens system 32 is a light blocking element, or opaque shutter 36, which covers the entire left half of the lens system and precludes the passage of light rays $R_L$ from the left side of visual scene 30 from passing directly through the left side of the lens system onto the recording surface. The right half of the lens system remains unobstructed to permit passage of light rays $R_R$ and $R_L$ from the visual scene onto the recording surface. Light rays $R_L$ from the left half of the visual scene are illustrated in broken lines, while the light rays $R_R$ from the right half of the scene are illustrated in solid lines. Thus it can be seen that the total recording surface 34 receives a greater amount of light rays $R_R$ from the right half of the visual scene to produce a more predominant right view of the visual scene than the left view. Correspondingly, when the blocking shutter 36 is moved to the position 36' indicated by broken lines to cover the right half of lens system 32, the recording surface will receive a greater amount of light rays from the left half of the visual scene and thus a predominant left view of the scene.

Figure 4:
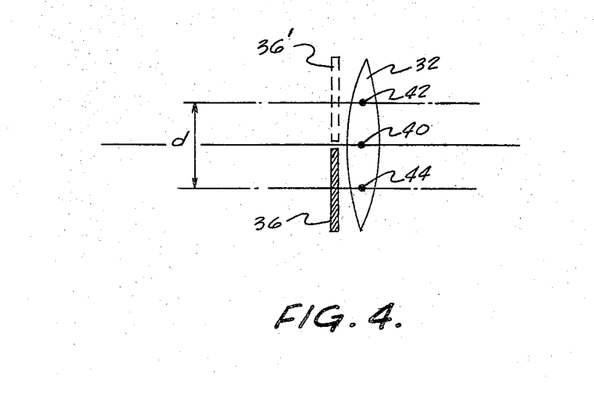
FIG. 4 is a diagrammatic plan view representation of the single lens camera system of FIG. 3 illustrating the lateral separation distance, or disparity, between the effective functioning lens centers of predominant right and left views of a visual scene, when utilizing a movable blocking shutter mechanism in accordance with the present invention.

The effect of the use of the blocking shutter on the lens system of a single lens camera with respect to lateral effective lens base separation of predominant right and left views is best illustrated by references to FIG. 4. When no blocking shutter is employed with the single lens system 32, the effective functioning center of the lens system as to light rays passing therethrough is the actual geometric center 40 of the lens. However, when the left half of the lens system is blocked by the shutter 36 the functioning center of the lens system as to light rays passing therethrough becomes located at point 42, in the center of the right half of the lens. Correspondingly, when shutter 36 is located at 36' to cover the right half of the lens system, the effective functioning center of the lens system as to light rays passing therethrough is located at point 44, in the center of the left half of the lens. Thus, by alternately blocking right and left halves of the lens system, as indicated in FIGS. 3 and 4, the recorded scenes of alternating predominant left and right views have their respective virtual centers spaced by the lateral distance d between the effective center points 42 and 44. In this manner, the alternating predominant right and left views are laterally spaced at a sufficient interocular distance, or effective lens base separation, to produce the necessary disparity therebetween, i.e., less than about 1 inch, as in the two-camera system of FIGS. 1 and 2, to record the desired three-dimensional effect on the recording surface or filmstrip.

Thus, it can be appreciated that a single lens motion picture camera with movable blocking shutter as illustrated in FIG. 3 may be employed to record laterally spaced, predominantly right and left views of a visual scene on a single recording surface or filmstrip in accordance with the basic teachings of the present invention. By use of a single camera and lens system with single filmstrip recording surface, it is not necessary to edit film frames from two filmstrips, as in the two-camera system of FIGS. 1 and 2, to obtain a single filmstrip for a three-dimensional projection and viewing in stereopsis. Additionally, because the single lens system is employed to alternately record right and left views of the visual scene, the single lens and camera system eliminates the problem of focal length differences of the two lens systems of a two-camera arrangement and would give identical sizes at the image plane of the three-dimensional recording and would reduce shake or "keystoning" of the projected picture to a negligible amount.

Figure 5A:
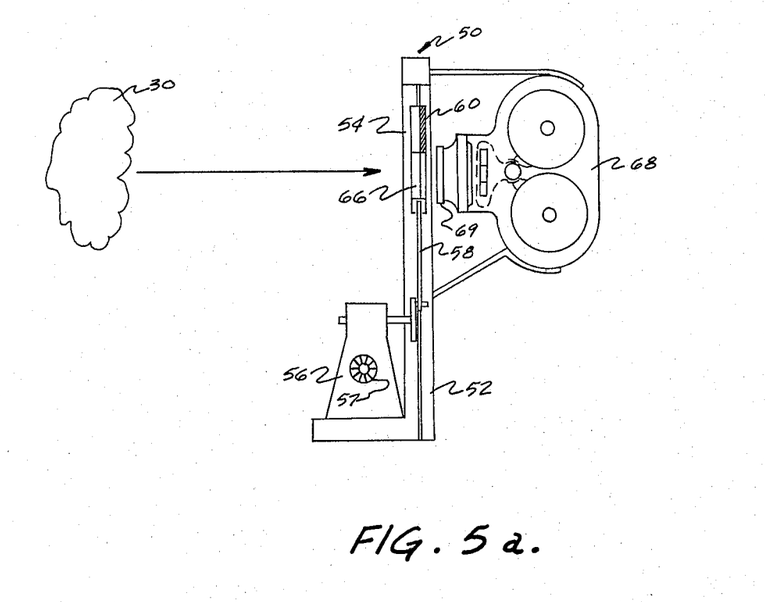
FIGS. 5a and 5b are schematic side and front elevation views, respectively, of a single lens motion picture camera with lens-blocking attachment for recording alternating predominantly left and right views of a three-dimensional visual scene on a single filmstrip which may be projected for stereoptic viewing on a two-dimensional surface.
Figure 5B:
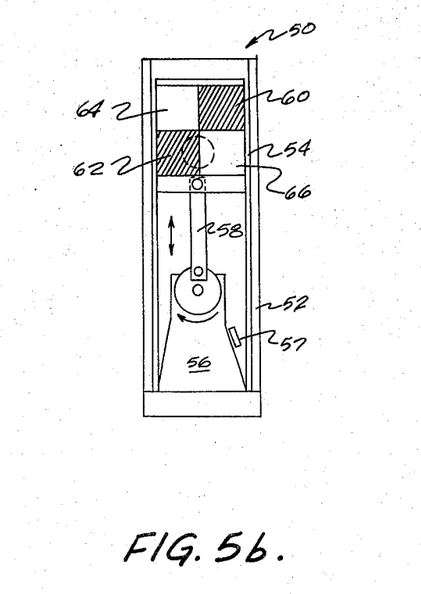

FIGS. 5a and 5b illustrate, in side and front elevation view, respectively, a single lens motion picture camera apparatus which may be employed in carrying out the aforementioned modified embodiment of the present invention shown in FIGS. 3 and 4. As shown, the visual scene 30 is photographed by the camera through a reciprocating shutter mechanism 50 comprising a support frame 52 having a generally rectangular shutter 54 slidably mounted for vertical movement in frame 52 by means of a variable speed motor 56 having a speed-control knob 57 and an eccentric crank arm 58 attached to the shutter 54. Shutter 54 comprises two diagonally opposed, opaque sections 60, 62 and two corresponding clear sectons 64, 66 (FIG. 5b). The camera 68 is supportably positioned such that the opaque shutter sections 60, 62 during reciprocation of the shutter by variable speed motor 56 alternately block opposite halves of the lens to provide predominant right and left views of the visual scene being recorded. By adjusting the speed of the drive motor in reference to the film speed of the camera, one or more alternating frame groups of predominant left and right views of the visual scene are recorded on the single filmstrip of the camera. Thus, depending upon the frame groupings selected to achieve optimum three-dimensional reproduction, as hereinbefore explained, the single camera and lens system may be effectively varied to record the three-dimensional visual scene for stereoptic viewing.

The effective lens base separation, or disparity, of predominant right and left views from the single lens camera may be varied in accordance with the size and distance of the nearest non-moving object in the scene from the camera, as aforementioned, by means of the conventional light-control, variable diameter shutter located in the lens system of the camera. As is well known, the variable diameter shutter or stop setting adjustment 69 of motion picture camera 68 may be manually adjusted to correspondingly vary the effective diameter of the camera lens to allow more or less light to enter the camera and expose the film. Thus by increasing or decreasing the effective diameter of the lens system, it can be appreciated that the distance d between the effective centers 42, 44 of the predominant right and left views, as illustrated in FIG. 4, is correspondingly varied to provide the optimum disparity between the views (between about one-eighth inch and one inch) for stereoptic viewing. To compensate for light changes in the recorded film images when the variable diameter shutter is adjusted, filters may be employed in known manner to provide the lighting desired.

With a single lens system camera set-up as shown and illustrated in FIGS. 3, 4, 5a and 5b, focus disparity between right and left spaced views of the scene being recorded may be varied as hereinbefore described, with respect to the nearest non-moving object, by suitable electrical or mechanical focus control means employed during the recording of the scene to alternate the focus of the lens system in sequence timed with the blocking shutter mechanism 50 of the camera. The provision of such focus control means are believed to be well within the skill of the art and details thereof are not included herein.

Figure 6:
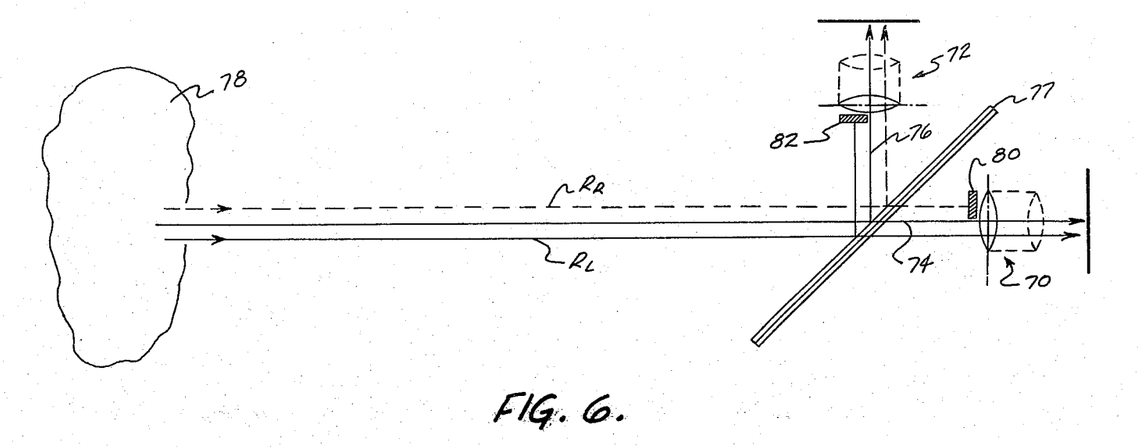
FIG. 6 is a diagrammatic plan view representation of a modified form of two-camera arrangement for recording a three-dimensional visual scene for subsequent stereoptic visualization on a two-dimensional receiving surface.

FIG. 6 illustrates in plan view a further modified form of apparatus which may be employed in practicing the present invention. The apparatus comprises a two-camera system with two-way mirror having 50% reflectivity and 50% transmission characteristics as the mirror of FIG. 1. Two cameras with single lens systems 70, 72 are positioned at right angles with their central lens axes 74, 76 directed to a common point on mirror 77 positioned at a 45° angle to the lens axes to direct the central lens axes along a common axis toward visual scene 78. Thus, light rays from visual scene 78 pass directly to the lens of camera 70 through the mirror and are correspondingly reflected to the lens system of camera 72 by the mirror. One-half of the lens system of camera 70 is permanently blocked by a fixed blocking element or shutter 80, while corresponding half of the lens system of camera 72 is blocked by a fixed shutter 82. Thus, it can be seen that light rays $R_L$ predominantly from the left side of the visual scene 78 pass directly into the lens system of camera 70 while light rays $R_R$ predominantly from the right side of the visual scene are reflected into the lens system of camera 72. The filmstrip of camera 70 thus records a predominantly left view of the visual scene while the flimstrip of camera 72 records a predominantly right view of the visual scene. The two filmstrips are thereafter edited, as described in the embodiment of the invention illustrated in FIGS. 1 and 2, to produce a composite single filmstrip of alternating right and left view groups which may be projected to permit three-dimensional stereoptic viewing on a two-dimensional surface.

Figure 7:
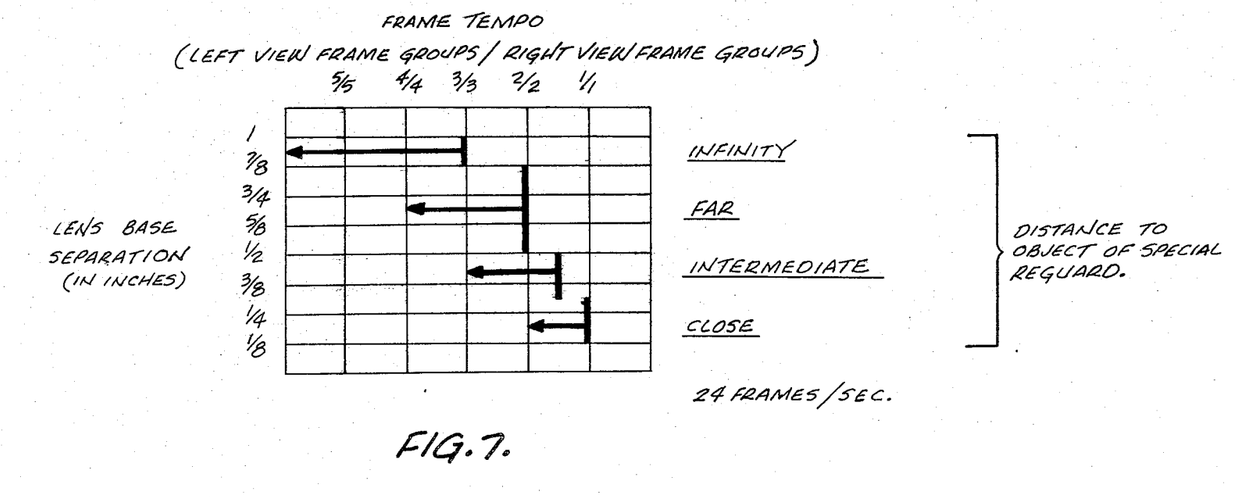
FIG. 7 is a chart illustrating preferred lens base separation and right and left view frame sequencing durations when recording a visual scene with a standard motion picture camera having a film speed of 24 frames per second.

The chart of FIG. 7 illustrates graphically the range of synchronization between right and left view film frame groupings, and the variable distance between right and left views which may be controlled by a camera operator to provide optimum stereoptic recording, depending upon the size of and distance of the nearest non-moving object in the visual scene to be recorded. As previously mentioned, depending upon the size and distance of the nearest non-moving object, the alternating number of frame groups of left and right views as well as the lens base separation therebetween, may be increased or decreased within specified limits within the visio-psychological alternation rate between right and left views of the visual apparatus to achieve optimum stereopsis. As illustrated in FIG. 7, for prominent non-moving objects of close regard, optimum stereoptic reproduction may be achieved with a conventional motion picture camera having a film speed of 24 frames per second by utilizing a frame group alternation rate of from about 1 left, 1 right to 2 left, 2 right at a ⅛" to ¼" lens base separation between left and right views. For intermediate distance non-moving objects, the frame group rate may vary from about 2 left, 2 right to 3 left, 3 right with a lens base separation between right and left views of from about ¼" to ½". Similarly, best stereoptic recording of far non-moving objects may employ from about a 3 left, 3 right, to a 4 left, 4 right frame grouping at a lens base separation of from about ½" to ⅝". Non-moving objects at infinity may be recorded with a frame grouping of 3 left, 3 right, to 5 left, 5 right at a lens base separation of from about ⅞" to one inch. Correspondingly, focus disparity between right and left views of the scene also may be varied in accordance with the aforementioned range of distances set forth hereinabove.

Thus, it can be appreciated that the camera operator, in recording the visual scene for stereoptic reproduction, whether with a dual camera arrangement as shown in FIGS. 1, 2 and 6, or with the single camera arrangement of FIGS. 3-5, may control the frame grouping ratio and the lens base separation distance of left and right views within the limits illustrated in FIG. 7 to obtain optimum stereoptic reproduction effect in the recorded scene. Keystoning can also be further minimized by utilizing focus differentiation of the left and right views.

Figure 8:
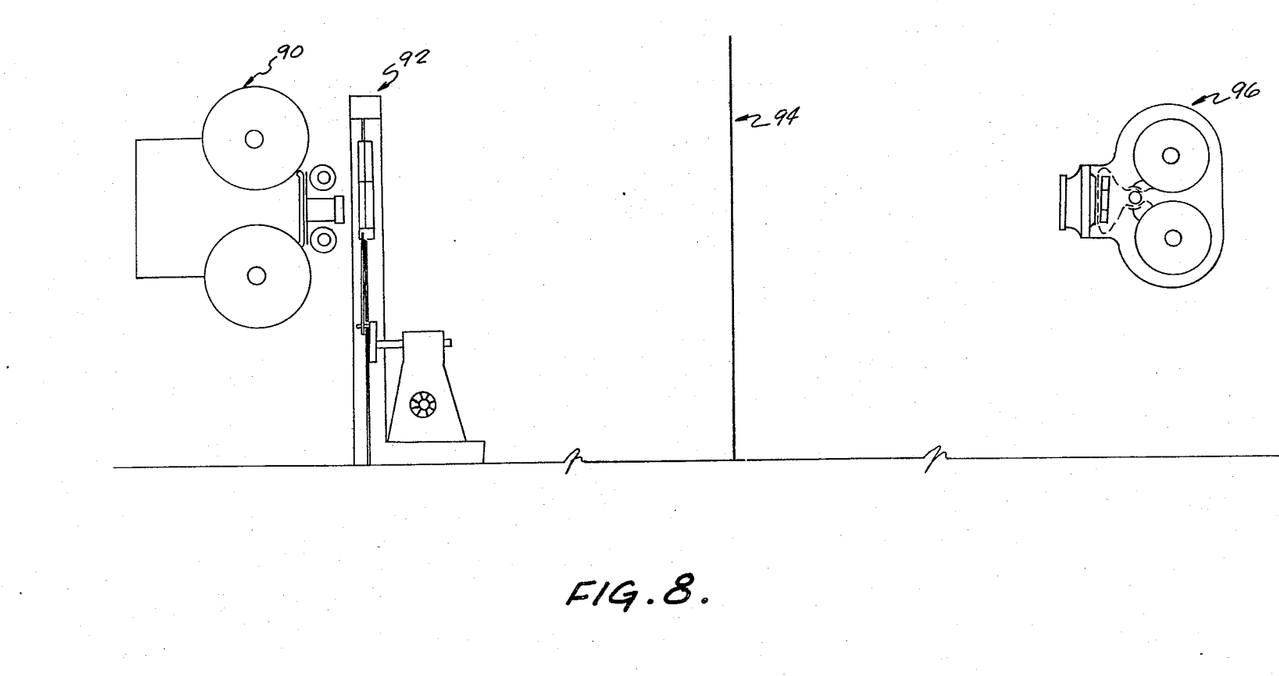
FIG. 8 illustrates in side elevation view still another embodiment of the present invention wherein a conventional two-dimensional motion picture film may be projected in desired predominant left and right view film frame sequence and re-recorded for viewing in stereopsis.

It is contemplated that a basic concept of the present invention, i.e., the simultaneous recording of predominant left and right views of a visual scene from laterally spaced positions less than one inch apart may be employed to convert conventional two-dimensional motion pictures for visualization in stereopsis. As shown in FIG. 8, a conventional two-dimensional motion picture may be projected by a projector 90 through a shutter mechanism 92 of the type described in FIGS. 5a and 5b onto a translucent receiving surface or screen 94. The scene on the screen is continuously recorded by a conventional motion picture camera 96 located behind the screen. By coordination of the speed of operation of the blocking shutter mechanism to the degree of motion of objects in the scene, the projector operator may create a visual stereoptic effect for recording by camera 96.

In the embodiment of FIG. 8, the disparity, i.e., the distance between lens bases, of predominant left and right views is not varied, as in the embodiments of FIGS. 1-7. Instead the motion picture projector operator depends upon the movement of objects of regard in the two-dimensional motion picture film to create the necessary disparity between left and right views to create the stimulus for stereoptic recording. For example, the blocking shutter mechanism 92 is controlled and regulated by observation of the particular scene and movement therein being projected on the translucent screen 94. If the scene being projected on the screen has fast action or if the camera is moving and the nearest movement in the scene is close, the film frame group alternation to achieve stereopsis may be from about one left, one right to about two left, two right. If the same conditions in the scene exist except that movement in the scene is at intermediate distance, then a two left, two right to three left, three right film frame group alternation may be employed. for far movement in scenes, three left, three right to four left, four right may be employed, while at infinity, the alternation of the shutter between about four left, four right to five left, five right may provide best stereoptic reproduction.

It can be understood that blocking shutter apparatus other than that shown in FIGS. 5a and 5b may be employed to alternately block left and right halves of the camera lens of the motion picture projector lens. For example, a rotating disc shutter may be utilized to create the blocking effect, so long as the shutter may be regulated by the operator to provide the film frame right left tempo groupings desired for stereoptic reproduction.

That which is claimed is:

1. A process for reproducing a visual scene which may be viewed in stereopsis by the unaided human eye comprising the steps of:
   (a) recording a plurality of right and left views of a common visual scene from corresponding right and left positions laterally displaced from each other in a common plane at a distance of no more than about 1 inch apart, and
   (b) continuously projecting, in alternation, a sequential group of one or more of said right recorded views and a sequential group of one or more of said left recorded views on to a receiving surface for viewing by the human eye, said duration of projection of said alternating groups being such that the visual duration of each group on said surface varies from a minimum to a maximum duration which is generally correspondingly proportional to the distance of the nearest non-moving object of special regard in the scene from said left and right recorded positions, and wherein said duration is approximately equal to the visio-psychological alternation rate between right and left views of the human visual apparatus.

2. A process as defined in claim 1 wherein said right and left recording positions are displaced at a distance of between about one-eighth inch to one inch.

3. A process as defined in claim 2 wherein said distance is approximately one-half inch.

4. A process as defined in claim 1 wherein the duration of projection of each of said groups of right and left views varies between about one-twenty-fourth second to one-fourth second.

5. A process as defined in claim 4 wherein said duration is approximately one-eighth second.

6. A process as defined in claim 1 wherein said right and left views are recorded by continuously simultaneously photographing said visual scene with two motion picture cameras positioned at an effective lens base separation of no more than about one inch.

7. A process as defined in claim 6 wherein said right and left recorded views are projected on said receiving surface by:
   (a) preparing a motion picture filmstrip of the views recorded by each of said cameras;
   (b) combining the filmstrip views from each camera onto a single filmstrip to obtain alternately repeating, sequential groups of one or more consecutive film frames from each camera and with frames aligned such that non-moving objects in said alternating groups of frames are positioned in superimposed relation for viewing; and
   (c) projecting said single filmstrip onto said receiving surface from a single projector at a rate such that each repeating group of frames has a visual duration on said surface which varies from a minimum to a maximum duration which is generally correspondingly proportional to the distance of the nearest non-moving object of special regard in the scene from said left and right recording positions, and wherein said duration is approximately equal to the visio-psychological alternation rate of the eyes of the human visual apparatus.

8. A process as defined in claim 7 wherein the number of film frames in each of said groups on said single filmstrip varies from about one to six at recording and projecting film speeds of 24 frames per second.

9. A process as defined in claim 7 wherein said frame groups are alternately projected onto said receiving screen for viewing by the human eye at a rate of between about one-twenty-fourth to one-fourth of a second per group.

10. A process as defined in claim 1 wherein said right and left views are recorded by recording means in which the central point of focus of one of said views is located at a point from said recording means which is approximately two-thirds the distance between said recording means and the nearest non-moving object in the scene, and the central point of focus of the other of said views is located at a point from said recording means which is approximately one and one-third the distance between said recording means and said nearest non-moving object in the scene.

11. A process for producing a single motion picture filmstrip which may be viewed in stereopsis by the unaided human eye comprising the steps of:
   (a) simultaneously recording on motion picture film right and left views of a common visual scene from right and left recording positions located at an effective lens base separation of no more than about one inch;
   (b) developing said right and left view-containing film; and
   (c) producing from said right and left view film a single filmstrip comprising alternating sequential groups of one or more frames from said right view film followed by one or more frames from said left view film, each of said alternating groups of frames containing a sufficient number of frames of its respective views to provide a visual image duration of said view when said single filmstrip is projected onto a viewing surface which varies from a minimum to a maximum duration which is generally correspondingly proportional to the distance of the nearest non-moving object of special regard in the scene from said left and right recording positions, and which duration is approximately equal to the visio-psychological alternation rate of right and left view images in the human visual apparatus.

12. A process as defined in claim 11 including the step of maintaining the central focal distance of one of said views in front of the nearest non-moving object in the scene while maintaining the central focal distance of the other of said views beyond said object during said simultaneous recording thereof.

13. A process as defined in claim 12 wherein said central focal distance of said one of said views is approximately two-thirds of the distance from said recording position to said object and said central focal distance of said other of said views is approximately one and one-third the distance from said recording position to said object.

14. A process as defined in claim 13 wherein said effective lens base separation is approximately one-half inch and said visual image duration is approximately one-eighth of a second.

15. A process as defined in claim 11 wherein said groups are sequenced on said single filmstrip to provide a visible image of each group, upon projection, of between about one-twenty-fourth to one-fourth of a second.

16. A process as defined in claim 11 wherein each of said groups contains from about 1 to 6 film frames at recording and projecting film speeds of about 24 frames per second.

17. A process as defined in claim 16 wherein each group contains 3 film frames.

18. A process as defined in claim 17 wherein said effective lens base separation is about one-half inch.

19. A process as defined in claim 16 wherein said effective lens base separation is between about one-eighth to one inch.

20. A process for recording a visual scene which may be projected onto a receiving surface for visualization in stereopsis by the unaided human eye comprising the steps of:
   (a) simultaneously recording visual image-producing information of right and left views of a common scene from respective right and left laterally spaced view-recording positions located in a common plane at a distance no more than about one inch apart; and
   (b) positioning in repeating sequence, for projection onto a receiving surface for visualization, a group of right view image-producing information followed by a group of left view image-producing information, the amount of information in each group being sufficient to maintain a visual image of the right or left view on a receiving surface for a time duration which varies from a minimum to a maximum duration which is generally correspondingly proportional to the distance of the nearest non-moving object of special regard in the scene from said left and right recording positions, and which duration is approximately equal to the visio-psychlogical alternation rate between right and left eye views of the human visual apparatus.

21. A process as defined in claim 20 wherein said time duration is between about one-twenty-fourth to one-fourth of a second.

22. A process as defined in claim 21 wherein said distance is from about one-eighth to one inch.

23. A process as defined in claim 22 wherein said right and left position distance is from about one-fourth to three-fourths of an inch.

24. A process as defined in claim 20 wherein said time duration is about one-eighth of a second and said right and left position distance is about one-half of an inch.

25. A motion picture filmstrip containing visual scenes thereon which may be projected on a receiving surface for visualization in stereopsis by the unaided human eye, said filmstrip comprising a plurality of alternating film frame groups of one or more sequential right view images followed by one or more sequential left view images of a visual scene, said right and left view images of said visual scene having been recorded by respective right and left camera means having an effective lateral lens base separation of no more than about one inch, the number of frames in each of said frame groups, when projected, creating alternating right and left view images of the visual scene which have a visual duration on a receiving surface which varies from a minimum to a maximum duration which is generally correspondingly proportional to the distance of the nearest non-moving object of special regard in the scene from said camera means, and which is approximately equal to the visio-psychological alternation rate of right and left eye views in the human visual apparatus.

26. A motion picture filmstrip as defined in claim 25 wherein the number of film frames in each of said groups comprises one to six frames.

27. A filmstrip as defined in claim 25 wherein one of said groups of images of said filmstrip is recorded at a central focal distance from its respective recording camera which is less than the distance from said camera to the nearest non-moving object in the visual scene, and the other of said groups of images is recorded at a central focal distance from its respective recording camera which is more than the distance from said camera to said object.

28. A filmstrip as defined in claim 27 wherein said central focal distance of said one group is approximately two-thirds of the distance to said object, and said central focal distance of said other group is approximately one and one-third the distance to said object.

29. A process for reproducing a visual scene which may be viewed in stereopsis by the unaided human eye comprising the steps of:
(a) recording a visual scene with a motion picture camera, while
(b) alternately blocking left and right half portions of the lens system of the camera during recording to prevent light rays from the visual scene from passing through said left and right half portions to alternately record predominant left and right half views of the visual scene at an effective lens base separation of no more than about one inch apart and for a duration which varies from a minimum to a maximum time which is generally correspondingly proportional to the distance of the nearest non-moving object of special regard in the scene from said camera, and which is approximately equal to the visio-psychological suppression rate between right and left eyes of the human visual apparatus, and
(c) continuously projecting said recorded views onto a receiving surface for viewing by the human eye.

30. A process as defined in claim 29 including the steps of continuously altering the central point of focus of said camera lens system during recording of the visual scene such that the central point of focus of one of said left or right half lens views of the scene is maintained at a central focal distance beyond the nearest non-moving object in the scene while the other of said left or right half lens views of the scene is maintained at a central focal distance in front of said nearest non-moving object in the scene.

31. A process as defined in claim 30 wherein said one of said lens views is maintained at a central focal distance approximately two-thirds of the distance from said camera to said nearest non-moving object while said other of the lens views of the scene is maintained at a central focal distance approximately one and one-third of the distance from said camera to said object.

32. A process as defined in claim 31 wherein said effective lens base separation of said left and right views is approximately one-half inch and the duration of each of said left and right half views is approximately one-eighth of a second.

33. A process as defined in claim 29 wherein said predominant left and right recorded views are recorded at an effective lens base separation distance of between about one eighth inch to one inch.

34. A process as defined in claim 33 wherein each of said predominant left and right views are recorded for a duration of between about one-twenty-fourth of a second to one-fourth of a second.

35. A process for reproducing a visual scene which may be viewed in stereopsis by the unaided human eye comprising the steps of:
(a) recording a visual scene with a pair of motion picture cameras positioned such that the central axis of the lens system of each camera is directed along a common axis toward said visual scene;
(b) simultaneously continuously blocking one-half of the lens system of each camera such that light rays predominantly from the left half portion of the visual scene are recorded by one of said cameras while light rays predominantly from the right half of the visual scene are recorded by the other of said cameras, with the effective lens base separation distance between said predominant left and right recorded views being maintained at less than about one inch; and
(c) continuously projecting, in alternation, a sequential group of one or more of said right recorded views and a sequential group of one or more of said left recorded views onto a receiving surface for viewing by the human eye, said duration of projection of said alternating groups being such that the visual duration of each group on said surface varies from a minimum to a maximum duration which is generally correspondingly proportional to the distance of the nearest non-moving object of special regard in the scene from said motion picture cameras, and which is approximately equal to the visio-psychological alternation rate between right and left eye views of the human visual apparatus.

36. A process as defined in claim 35 wherein said duration of projection of each of said alternating groups varies between about one-twenty-fourth second to one-fourth second.

37. A process as defined in claim 35 wherein said cameras are positioned with their central lens axes directed at right angles to intersect at a point on the surface of a two-way mirror having 50% reflectivity and 50% transmissibility, said mirror being positioned at a 45° angle to the central lens axis of each of said cameras to direct the central axes of each of said lens systems along a common axis toward said visual scene being recorded.

38. A process for recording a two-dimensional motion picture for subsequent projection for visualization in stereopsis comprising the steps of:

(a) projecting with a motion picture projector a two-dimensional motion picture scene onto a receiving surface for visualization while recording the scene on the surface with a motion picture camera, (b) alternately blocking left and right half portions of the lens system of the projector to project corresponding predominant left and right half views of the visual scene on said receiving surface and the visual duration of each of said projected predominant right and left views having a visual duration which varies between about one-twenty-fourth to one-fourth of a second to obtain a stereoptic visualization of the scene on the surface.

39. A process as defined in claim 38 including the step of varying the visual duration of each of said predominant left and right half views of the scene in accordance with motion of objects in the visual scene and their apparent distance from the point of visualization to maximize stereoptic visualization of the scene on the surface for recording.

* * * * *